United States Patent Office 3,478,006
Patented Nov. 11, 1969

3,478,006
ELECTRICAL CONDUCTING PROPERTIES OF ACRYLIC SUBSTRATES BY INCORPORATION THEREIN OF A TRIAZINE COMPOUND
Brian Pilling, Decatur, Ala., assignor to Monsanto Company, St. Louis, Mo., a corporation of Delaware
No Drawing. Filed Aug. 3, 1966, Ser. No. 569,821
Int. Cl. C08f 15/38, 17/00, 37/18
U.S. Cl. 260—85.5                16 Claims

ABSTRACT OF THE DISCLOSURE

Electrical conducting properties of acrylic substrates are improved by mixing with the acrylonitrile copolymer from about 2% to about 8% of a triazine compound.

This invention concerns a process of imparting electrical conducting properties to substrates comprised of acrylonitrile copolymers containing a vinyl-substituted tertiary heterocyclic amine grouping within the copolymer. More specifically, the invention relates to a process of imparting improved electrical conducting properties to substrates comprised of an acrylonitrile copolymer containing a vinyl-substituted tertiary heterocyclic amine grouping within said copolymer by complexing with the amine grouping a triazine compound, and to substrates obtained by this process.

Work has been recently done to try and develope polymeric substrates capable of conducting electricity. Most of this work has concerned the synthesis of conductive polymers by introducing conjugation, free radicals, charge transfer complexes, and metal ions as part of the polymeric structure. The resulting products have been either insoluble, infusible powders, or if soluble, of low conductivity.

It has been discovered that the introduction of a triazine compound into an acrylonitrile copolymer containing a vinyl-substituted tertiary heterocyclic amine grouping with the copolymer imparts improved electrical conducting properties to the polymer.

It is therefore an object of this invention to provide a process of imparting improved electrical conducting properties to substrates comprised of an acrylonitrile copolymer containing a vinyl-substituted tertiary heterocyclic amine grouping within the copolymer.

It is also an object of this invention to provide a substrate comprised of an acrylonitrile copolymer containing a vinyl-substituted tertiary heterocyclic amine grouping within the copolymer which exhibits improved electrical conducting properties.

Other objects of this invention will become apparent as the invention is fully disclosed herein.

These and other objects of this invention are accomplished by providing a process of imparting improved electrical conducting properties to substrates comprised of an acrylonitrile copolymer containing a vinyl-substituted tertiary heterocyclic amine grouping within the copolymer comprising introducing into said copolymer a triazine compound of the following formula:

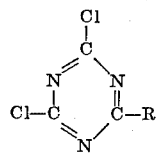

wherein R is selected from the group consisting of chloro, hydroxy, amino, alkyl, and aryl.

The term substrate as used herein is defined as a film, a woven fabric, a non-woven fabric and any article comprised of an acrylonitrile copolymer.

As mentioned previously, the substrate is comprised of an acrylonitrile copolymer containing a vinyl-substituted tertiary heterocyclic amine grouping within the copolymer. The term "acrylonitrile copolymer" is defined as a polymer containing at least about 35% by weight of polymerized acrylonitrile units and, preferably, at least about 80% of polymerized acrylonitrile units. Useful acrylonitrile copolymers include copolymers containing acrylonitrile units, interpolymers containing acrylonitrile units and blends of the two, these copolymers containing the heterocyclic amine grouping therein.

For example, the acrylonitrile copolymer can be a copolymer of from about 80 to about 98% of acrylonitrile and from about 2 to about 20% of a vinyl-substituted tertiary heterocyclic amine compound such as a vinylpyridine and an alkyl-substituted vinylpyridines, examples of the latter include 2-vinylpyridine, 4-vinylpyridine, and 2-methyl-5-vinylpyridine (herein called methylvinyl pyridine).

The acrylonitrile copolymer can also be a ternary interpolymer. Examples of ternary interpolymers include those obtained by the interpolymerization of acrylonitrile, a vinyl-substituted tertiary heterocyclic amine such as the vinyl-substituted pyridines and a mono-olefinic monomer selected from the group consisting of alpha-chloroacrylic and methacrylic acids; the acrylates such as methylmethacrylate, ethylmethacrylate, butylmethacrylate, methoxylmethyl methacrylate, beta-chloroethyl methacrylate, and corresponding esters of acrylic and alpha-chloroacrylic acids; vinyl chloride, vinyl fluoride, vinyl bromide, vinylidene chloride, 1-chloro-1-bromo-ethylene; methacrylonitrile acrylamide and methacrylamide; alpha-chloroacrylamide and monoalkyl substitution products thereof; methyl vinyl ketone; vinyl carboxylate such as vinyl acetate, vinyl chloroacetate, vinyl propionate and vinyl stearate; N-vinylimides such as N-vinyl phthalimide and N-vinyl succinimide; methylene malonic esters; itacon acid and itaconic esters; N-vinyl carbazole; vinyl furane; alkyl vinyl esters; vinyl sulfonic acids; ethylene alpha, beta-dicarboxylic acids and their anhydrides and derivatives thereof such as diethylcitraconate, diethyl mesaconate; styrene; vinyl naphthalene; 1-vinyl imidazole and alkyl-substituted 1-vinylimidazoles such as 5-methyl-1-vinylimidazole; and other similar monoolefinic copolymerizable materials. A preferred species of the ternary polymer contains from about 80 to about 98% of acrylonitrile, from about 1 to about 10% of a vinyl-substituted pyridine and from about 1 to about 18% of a copolymerizable mono-olefinic material selected from the group consisting of methacrylonitrile, vinyl acetate, methylmethacrylate, vinyl bromide, vinyl chloride and vinylidine chloride.

The acrylonitrile copolymer can also be a blend of two or more copolymers containing acrylonitrile and one of the above enumerated monoolefinic monomers providing at least one of the copolymers contains a vinyl-substituted tertiary heterocyclic amine grouping within the copolymer. An example of such a copolymer is a polymer blend containing 80 to 95% of a copolymer of 80 to about 98% of acrylonitrile and from about 2 to about 20% of a vinyl acetate and about 5% to about 20% of a copolymer of from about 25% to about 75% of acrylonitrile and from about 25% to about 75% of a vinyl-substituted tertiary heterocyclic amine compound such as methylvinyl pyridine. The acrylonitrile copolymer can also be a blend of one or more copolymers containing acrylonitrile and one of the above enumerated mono-olefinic monomers and a polymer such as polyvinyl chloride, providing at least one of the copolymers contains a vinyl-substituted tertiary heterocyclic amine and the blend contains at least about 70% of acrylonitrile units. For example, the acrylonitrile copolymers can be a blend containing from about 70 to about 90% of a copolymer of from about 80 to about 98% of acrylonitrile and from about 2% to about 20% of vinyl acetate, from about 5% to about 30% of a copolymer of from about 25% to about 75% of acrylonitrile and from about 25% to about 75% of a vinyl-substituted pyridine, and from about 5% to about 20% of a polymer of a vinyl-substituted halide. When the acrylonitrile copolymer is a blend, it is preferred that the blend be composed of from about 70 to about 90% of a copolymer of from about 80% to about 98% of acrylonitrile and from about 2 to about 20% of another monoolefinic monomer such as vinyl acetate, from about 5 to about 20% of a copolymer of from about 30 to about 90% of a vinyl-substituted tertiary heterocyclic amine such as vinyl pyridine or methylvinyl pyridine and from about 10 to about 70% of acrylonitrile and from about 5 to about 20% of a polyvinyl halide such as polyvinyl chloride or polyvinyl bromide, the blend having an overall vinyl-substituted tertiary heterocyclic amine content of from about 2% to about 10% based on the weight of the blend.

The triazine compounds useful with the invention are defined by the formula:

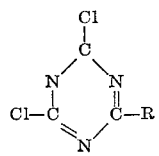

wherein R is selected from the group consisting of chloro, hydroxy, amino, alkyl and aryl. The amino group can be a primary, secondary or tertiary amino grouping, the primary amino grouping is preferred. The alkyl groupings can contain from 1 to about 4 carbon atoms, e.g. it can be methyl, ethyl, propyl or butyl. Examples of useful aryl groupings include phenyl. Preferably, the R grouping is selected from the class consisting of chloro, hydroxy, aryl and amino. Preferred triazine compounds include trichloro triazine (cyanuric chloride), dichloro hydroxy triazine, dichloro amino triazine, and dichloro phenyl triazine.

The amount of the triazine compound useful with the invention is within the range of from about 2% to about 8%, and preferably from about 3% to about 5%, the percents based on weight of the acrylonitrile copolymer and the copolymer containing from about 1% to about 12% by weight of a vinyl-substituted tertiary heterocyclic amine grouping. Where the acrylonitrile copolymer contains from about 3% to about 9% by weight of the amine grouping, it is preferred that the triazine compound be present in amounts ranging from about 3% to about 5%, the percents based on weight of the copolymer.

The triazine compound should be sufficiently mixed with the acrylonitrile copolymer so that the triazine molecule can attach itself to the vinyl-substituted tertiary heterocyclic amine grouping therein. For example, the triazine compound can be introduced into the acrylonitrile copolymer by mixing it with the copolymer in solution at ambient temperature for about 30 minutes. Higher and lower temperatures and different mixing times are also useful within the invention.

The exact characteristic or nature of the final product effected by the triazine compound and the vinyl-substituted tertiary heterocyclic amine grouping within the acrylonitrile copolymer is not known. It is thought that the significant effect of the triazine compound is the quaternization of the vinyl-substituted tertiary heterocyclic amine grouping by complex formation, the result of which imparts improved electrical conducting properties to dyed, undyed or pigmented substrates comprised of the herein disclosed acrylonitrile copolymers.

The substrate can be colored with an acid dye, disperse dye or basic dye. The substrate can also be pigmented to give it color, or the substrate can be of a natural color, i.e. without being dyed.

The following examples are presented to specifically illustrate working embodiments of the invention. Samples of the examples are cast into films by using a Gardner knife set to deposit a 0.015" thick layer of a polymeric solution onto a clean glass plate. The glass plate is then placed in an oven and the solvent within the solution is evaporated. The film is then cut to a strip measuring 6" long by ½" to 1" wide. Electrical conducting properties of the sample are then determined by placing the strip and connecting the ends thereof between two electrodes of a Rothschild Static Volt Meter, Type R 1019, Serial No. 6401, made by Elektronische, Mess- und Steuergerate, Zurich 2, Switzerland. An electrical charge of 100 volts is induced into the strip. The source of the charge is removed and the time is measured that it takes for the 100 volts to dissipate to 50 volts, referred to herein as static dissipation time for half-decay. This time is measured in minutes or seconds and indicates the characteristic of the polymer sample to dissipate charges of electricity. Any half decay time in excess of 3 minutes indicates a poor electrical conducting characteristic. Percents, where used, are based on weight unless otherwise specified.

EXAMPLE I

To samples of acrylonitrile copolymer solutions containing dimethyl formamide as the solvent and 10%, based on weight of polymer per volume of solution, of an acrylonitrile copolymer composed of 88% of a copolymer being 93% acrylonitrile and 7% vinyl acetate and 12% of a copolymer being 50% acrylonitrile and 50% methylvinyl pyridine, there is added the below indicated percents of trichloro triazine, the percents based on weight of the polymer. The resulting solutions are mixed for 30 minutes at room temperature. To samples 1, 2, and 3, there is added 1% (based on weight of the polymer) of C. I. Acid Blue 104 dissolved in dimethyl formamide and these solutions are mixed for an additional 10 minutes at room temperature. Sample 4 does not contain the dye. Thereafter, 0.015" thick films of the above polymeric solutions are cast on clean glass plates using a Gardner knife. The plates are then placed in an oven at 80°–90° C. for 30 minutes. The films are tested for static dissipation. The results of the test and the percents of trichloro triazine are indicated in Table 1:

TABLE 1

| Sample | Composition | Static Dissipation Time for Half Decay |
| --- | --- | --- |
| 1 Control | | Greater than 3 minutes. |
| 2 Test | 1% trichloro triazine | Do. |
| 3 Test | 5% trichloro triazine | 0.75 second. |
| 4 Test (undyed) | do | 0.5 second. |

These above data indicate the significance of the triazine compounds to impart electrical conducting properties to acrylonitrile substrates. Sample 2 shows that 1% of the triazine compound is not sufficient to impart these properties but Sample 3 shows that 5% imparts good electrical conducting properties to the substrate.

EXAMPLE II

The procedure of Example I is repeated except the acrylonitrile copolymer solutions contain the below indicated compositions. Also, the samples are not colored with the C. I. Acid Blue 104 dye. The results of the static dissipation tests and the identity of the compositions are indicated in Table 2:

TABLE 2

| Sample | Composition | Static Dissipation Time for Half Decay |
| --- | --- | --- |
| 1 | 5% dichlorohydroxy triazine | 3 seconds. |
| 2 | 5% dihydroxymonochloro triazine | Greater than 3 minutes. |
| 3 | 5% trihydroxy triazine | Do. |
| 4 | 5% triamino triazine | Do. |

These above data indicate the significance of the triazine compounds within the invention, i.e. a dihydroxy or a trihydroxy or a triamino substituted triazine will not give improved electrical conducting properties to the acrylic substrates. However, the dichlorohydroxy triazine compound gives significantly improved electrical conducting properties to the substrate.

What is claimed is:

1. A process of imparting improved electrical conducting properties to substrates of a copolymer containing at least about 35% by weight of polymerized acrylonitrile units and a vinyl substituted tertiary heterocyclic amine grouping within said copolymer comprising mixing with said copolymer while in solution from about 2% to about 8% of a triazine compound of the formula:

$$\begin{array}{c} Cl \\ | \\ C \\ \diagup \diagdown \\ N \quad N \\ | \quad \| \\ Cl-C \quad C-R \\ \diagdown \diagup \\ N \end{array}$$

wherein R is selected from the group consisting of chloro, hydroxy, amino, alkyl and aryl, the percents based on the weight of the copolymer, whereby a chemical reaction occurs between said copolymer and said triazine compound.

2. The process of claim 1 wherein the copolymer contains from about 3% to about 9% of the vinyl-substituted tertiary heterocyclic amine grouping.

3. The process of claim 1 wherein the vinyl-substituted tertiary heterocyclic amine grouping is methylvinyl pyridine.

4. The process of claim 1 wherein from about 3% to about 5% of the triazine compound is introduced into the copolymer.

5. A process of imparting improved electrical conducting properties to substrates comprised of a copolymer containing at least about 35% by weight of polymerized acrylonitrile and from about 1% to about 12% of a vinyl-substituted tertiary heterocyclic amine grouping within the copolymer comprising mixing with said copolymer while in solution at about room temperature from about 2% to about 8% of a triazine compound of the formula:

$$\begin{array}{c} Cl \\ | \\ C \\ \diagup \diagdown \\ N \quad N \\ | \quad \| \\ Cl-C \quad C-R \\ \diagdown \diagup \\ N \end{array}$$

wherein R is selected from the group consisting of chloro, hydroxy, amino, alkyl and aryl, the percents based on the weight of the copolymer, whereby a chemical reaction occurs between said copolymer and said triazine compound.

6. The process of claim 5 wherein the copolymer contains from about 3% to about 9% of the vinyl-substituted tertiary heterocyclic amine grouping.

7. The process of claim 5 wherein the vinyl-substituted tertiary heterocyclic amine grouping is methylvinyl pyridine.

8. The process of claim 5 wherein from about 3% to about 5% of the triazine compound is mixed with the copolymer.

9. The process of claim 5 wherein the triazine compound is trichloro triazine.

10. The process of claim 5 wherein the triazine compound is dichloro hydroxy triazine.

11. The process of claim 5 wherein the triazine compound is dichloro amino triazine.

12. A substrate having improved electrical conducting properties and comprised of a reaction product of a copolymer containing at least about 35% by weight of polymerized acrylonitrile units and from about 1% to about 12% of a vinyl-substituted tertiary heterocyclic amine grouping within said copolymer and a triazine compound of the formula:

$$\begin{array}{c} Cl \\ | \\ C \\ \diagup \diagdown \\ N \quad N \\ | \quad \| \\ Cl-C \quad C-R \\ \diagdown \diagup \\ N \end{array}$$

wherein R is selected from the group consisting of chloro, hydroxy, amino, alkyl and aryl, said reaction product produced by the process comprising mixing with said copolymer while in solution at about room temperature from about 2% to about 8% of said triazine compound, the percents based on the weight of the copolymer, whereby a chemical reaction occurs between said copolymer and said triazine compound.

13. A substrate having improved electrical conducting properties comprised of a reaction product of a copolymer containing at least about 35% by weight of polymerized acrylonitrile units and from about 1% to about 12% of a vinyl-substituted tertiary heterocyclic amine grouping within said copolymer and a triazine compound of the formula:

$$\begin{array}{c} Cl \\ | \\ C \\ \diagup \diagdown \\ N \quad N \\ | \quad \| \\ Cl-C \quad C-R \\ \diagdown \diagup \\ N \end{array}$$

wherein R is selected from the group consisting of chloro, hydroxy, amino, alkyl and aryl, said reaction product produced by the process comprising mixing with said copolymer while in solution at about room temperature from about 3% to about 9% of said triazine compound, the percents based on the weight of the copolymer, whereby a chemical reaction occurs between said copolymer and said triazine compound.

14. The substrate of claim 13 wherein the vinyl-substituted tertiary heterocyclic amine grouping is methylvinyl pyridine.

15. The substrate of claim 13 wherein the triazine compound is trichloro triazine.

16. The substrate of claim 13 wherein the triazine compound is dichloro hydroxy triazine.

References Cited

UNITED STATES PATENTS 3,218,285   11/1965   Suling et al.

OTHER REFERENCES

Beech et al., Chem. Abs., 54 (1960), p. 9310a.

HARRY WONG, JR., Primary Examiner

U.S. Cl. X.R.

260—63, 65, 78.5, 79.3, 80.72, 898